(12) United States Patent
Kosugi et al.

(10) Patent No.: US 10,239,129 B2
(45) Date of Patent: Mar. 26, 2019

(54) MACHINE TOOL (71) Applicant: SUGINO MACHINE LIMITED, Uozu, Toyama (JP)

(72) Inventors: Masato Kosugi, Toyama (JP); Yoshitaka Ikeda, Toyama (JP); Jun Oshida, Toyama (JP)

(73) Assignee: SUGINO MACHINE LIMITED, Uozu, Toyama (JP)

(*) Notice: Subject to any disclaimer, the term of this patent is extended or adjusted under 35 U.S.C. 154(b) by 0 days.

(21) Appl. No.: 15/702,433

(22) Filed: Sep. 12, 2017

(65) Prior Publication Data

US 2018/0207732 A1 Jul. 26, 2018

(30) Foreign Application Priority Data

Jan. 23, 2017 (JP) ................................. 2017-009567

(51) Int. Cl.
*B23C 1/10* (2006.01)
*B23B 39/16* (2006.01)
(Continued)

(52) U.S. Cl.
CPC ............ *B23B 39/167* (2013.01); *B23B 39/04* (2013.01); *B23B 39/168* (2013.01); *B23Q 1/626* (2013.01); *B23Q 39/023* (2013.01); *B23Q 39/026* (2013.01); *B23C 1/10* (2013.01); *B23Q 2039/006* (2013.01); *Y10T 408/378* (2015.01);
(Continued)

(58) Field of Classification Search
CPC ............. Y10T 29/5107; Y10T 29/5105; Y10T 409/307168; Y10T 408/385; Y10T 408/38; Y10T 408/3806; Y10T 408/3844; Y10T 408/375; Y10T 408/378; Y10T 408/3784; Y10T 408/5616; B23C 1/10; B23Q 39/025; B23Q 39/026; B23Q 39/027; B23Q 2039/006
See application file for complete search history.

(56) References Cited

U.S. PATENT DOCUMENTS 1,511,164 A * 10/1924 Hey ..................... B23B 39/16
408/130
2,289,855 A * 7/1942 Ralston ................. B23B 39/16
408/130
(Continued)

FOREIGN PATENT DOCUMENTS

JP 2012-166292 A 9/2012
JP 2015-182149 A 10/2015

OTHER PUBLICATIONS

Sugino Machine Limited, "Submission of Certificate of Exception to Lack of Novelty of Invention—International Manufacturing Technology Show 2016 (IMTS 2016), Sep. 13, 2017 (Japan Time)" (2017).

*Primary Examiner* — Daniel Howell
*Assistant Examiner* — Yasir Diab
(74) *Attorney, Agent, or Firm* — Merchant & Gould P.C.

(57) ABSTRACT

Provided is a machine tool including: a bed; a work-table which is provided to the bed; a moving device provided to the bed; a spindle head provided to the moving device; at least a vertical main spindle provided to the spindle head, the vertical main spindle extending in the vertical direction; and at least a horizontal main spindle provided to the spindle head, the horizontal main spindle extending in a horizontal direction.

21 Claims, 6 Drawing Sheets

(51) Int. Cl.
*B23Q 1/62* (2006.01)
*B23Q 39/02* (2006.01)
*B23B 39/04* (2006.01)
*B23Q 39/00* (2006.01)

(52) U.S. Cl.
CPC .................. *Y10T 408/3806* (2015.01); *Y10T 409/307168* (2015.01)

(56) References Cited

U.S. PATENT DOCUMENTS

| | | | | | |
|---|---|---|---|---|---|
| 2,393,696 | A | * | 1/1946 | Kraut | B23B 39/02 29/26 R |
| 2,430,843 | A | * | 11/1947 | Colwell | B23Q 1/70 310/268 |
| 2,651,975 | A | * | 9/1953 | Soloff | B44B 3/00 144/144.1 |
| 3,371,580 | A | * | 3/1968 | Barnes | B23Q 1/525 144/96 |
| 3,413,893 | A | * | 12/1968 | Wilson | B23C 1/12 409/201 |
| 3,682,560 | A | * | 8/1972 | Suizu | B23B 39/18 408/46 |
| 3,746,459 | A | * | 7/1973 | Kindelan | B23B 39/22 408/37 |
| 3,822,958 | A | * | 7/1974 | Lewis | B23B 39/161 408/129 |
| 3,977,804 | A | * | 8/1976 | Kitagawa | B23B 39/16 408/16 |
| 4,215,958 | A | * | 8/1980 | Jagers | B23B 41/003 408/38 |
| 5,134,762 | A | * | 8/1992 | Scott | B23B 41/12 29/26 A |
| 5,943,750 | A | * | 8/1999 | Koren | B23Q 37/00 29/26 A |
| 6,070,312 | A | * | 6/2000 | Mantovani | B23Q 1/015 29/26 A |
| 6,345,939 | B1 | * | 2/2002 | Poeting | B23B 41/003 408/236 |
| 2008/0240878 | A1 | * | 10/2008 | Rogers | B23B 39/06 408/130 |
| 2011/0052341 | A1 | * | 3/2011 | Horn | B23Q 7/1431 409/159 |

* cited by examiner

MACHINE TOOL

CROSS REFERENCE TO RELATED APPLICATION

This application claims the foreign priority benefit under Title 35, United States Code, § 119(a)-(d) of Japanese Patent Application No. 2017-009567, filed on Jan. 23, 2017 in the Japan Patent Office, the disclosure of which is herein incorporated by reference in its entirety.

BACKGROUND OF THE INVENTION

1. Field of the Invention

The present invention relates to a machine tool.

2. Description of the Related Art

JP 2012-166292 A disclosed a multispindle drilling machine to perform a process of making a plurality of holes efficiently. The multispindle drilling machine includes a plurality of tools attached to a plurality of main spindles, respectively. Generally, the multispindle drilling machine performs the process of making a plurality of holes with a plurality of main spindles, respectively, at the same time.

SUMMARY OF THE INVENTION

An aspect of the present invention provides a machine tool capable of performing a hole making process in multiple directions per one setting operation of the workpiece in a single tool machine without changing an orientation of the workpiece.

An aspect of the present invention provides a machine tool capable of making hole in a plurality of directions once the workpiece is set.

An aspect of the present invention provides a machine tool. The machine tool includes: a bed; a work-table provided to the bed; a moving device provided to the bed; a spindle head provided to the moving device; a vertical main spindle provided to the spindle head, the vertical main spindle extends in the vertical direction; and a horizontal main spindle provided to the spindle head. The horizontal main spindle is extended in the horizontal direction.

An aspect of the present invention provides a machine tool. The machine tool is capable of machining in two directions on the workpiece per one setting operation of the work piece using vertical main spindle and a horizontal main spindle.

DETAILED DESCRIPTION OF THE INVENTION

First and second non-limiting embodiments are described below.

First Embodiment

A first embodiment of the present invention is described below referring to FIG. 1.

The machine tool 1 includes a bed 11, a work-table 12, a spindle head 23, and a moving device 10 for moving the spindle head 23 relative to a work-table 12. The spindle head 23 includes at least one (four in the first embodiment) vertical main spindle 25, and at least one (four in the first embodiment) horizontal main spindle 333.

The work-table 12 is provided at a front area of the bed 11. At least one workpiece 4 can be fixed (set) to the work-table 12. Preferably, a plurality (four in the first embodiment) of the workpieces 4 are fixed (set) to the work-table 12. When a plurality of the workpieces 4 are set, the workpieces 4 are arranged in line in a left-right direction which is a predetermined arranging direction with the equal intervals 35.

The predetermined arranging direction is orthogonal with axes of the vertical main spindle 25 and the horizontal main spindle 333 and defined as the left-right direction in the first embodiment.

Preferably, a pedestal 121 is provided rotatably on a rotation axis 3. The work-table 12 includes a drive motor 122 used as a servo motor. The toothed pulley 123A on a driving side is fixed to a shaft of the drive motor 122. The pedestal 121 is rotatably supported on an axis by the work-table 12. A toothed pulley 123B on a slave side is fixed to the pedestal 121. An endless toothed belt 123C is wound around two types of the toothed pulleys 123A, 123B. A drive force of the drive motor 122 is transmitted to the pedestal 121 by the endless toothed belt 123C and the toothed pulleys 123A, 123B. Regarding the force transmission mechanism, in place of the belt transmission mechanism according to the first embodiment, a gear drive force transmission mechanism (not shown) is usable.

The pedestal 121 includes a clamping device 128 such as a collet chuck, draw down chuck or three claw chuck to hold the workpiece 4. The workpieces 4 are set to the pedestals 121 with the clamping devices 128, respectively.

On the work-table 12, a hydraulic pressure cylinder 124 may be installed on the work-table 12 to provide driving in a direction in parallel to the rotation axis 3. In this case, a clamping arm 126 extendable in a direction perpendicular to the rotation axis 3 is installed on the hydraulic pressure cylinder 124. Further, a clamping body 127 is installed on a tip of the clamping arm 126 rotatably on the rotation axis 3. When the hydraulic pressure cylinder 124 extends, the clamping body 127 releases the workpiece 4. When the hydraulic pressure cylinder 124 is shortened, the clamping body 127 clamps the workpiece 4. The clamping body 127 rotates integrally with the workpiece 4 and the pedestal 121 on the rotation axis 3. As the clamping device 128, there are various clamping devices. For example, the device disclosed in JP2015-182149 A is usable.

The work-table 12 can have a clamp (not shown) configured to clamp the pedestal 121. The work-table 12 may have clamps for each pedestal 121.

Figure 1:
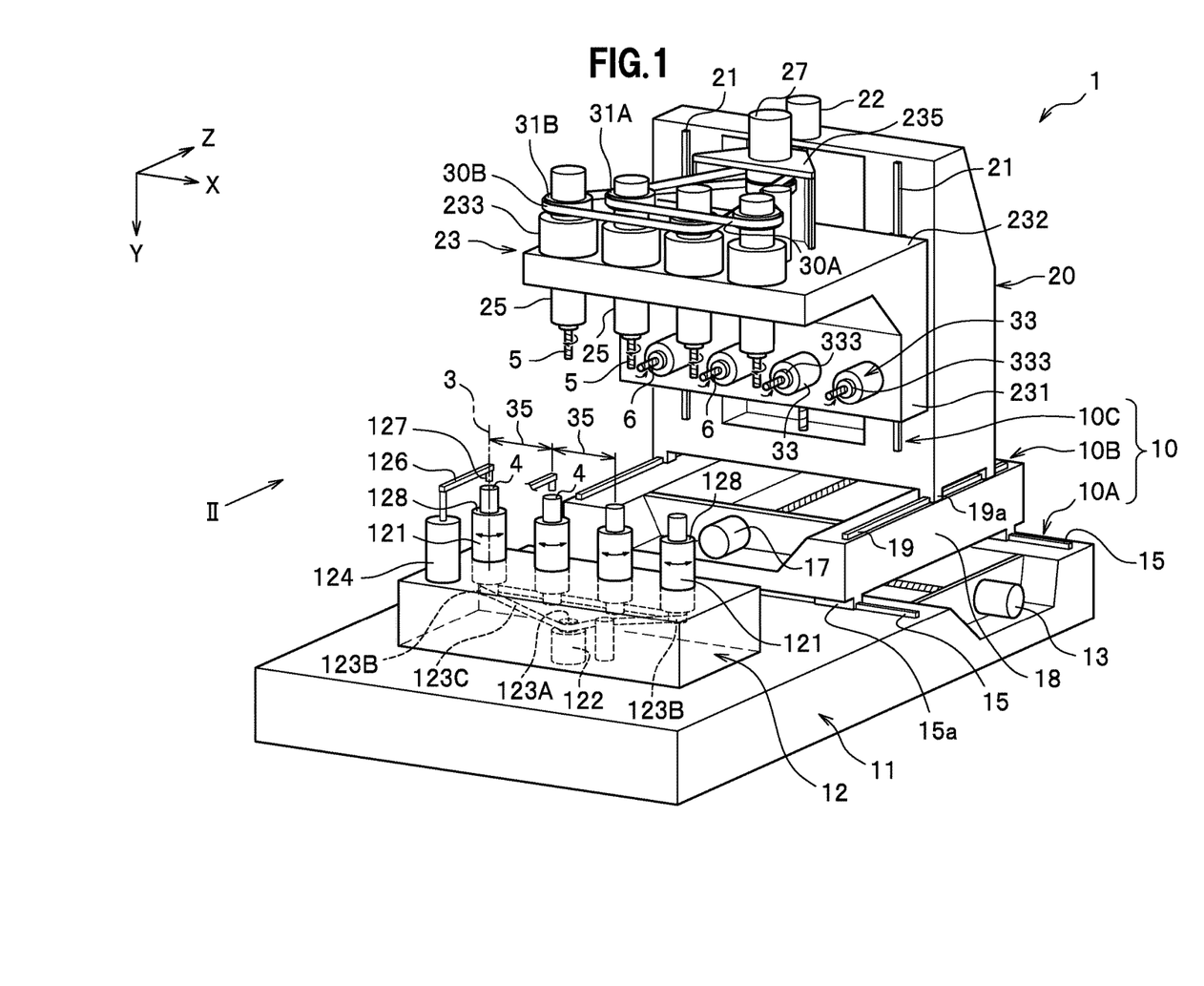
FIG. 1 is a perspective front view of a machine tool according to a first embodiment of the present invention.

In FIG. 1, the rotation axis 3 is set to be in the vertical direction. However, the rotation axis 3 may be set in the front-rear direction. The work-table 12 may be installed on a turn table which is provided on the bed 11 rotatable on an axis in the vertical direction. Further, the work-table 12 may include a table exchanging mechanism which exchanges the work-table 12 for another work-table.

When the workpiece 4 can be sufficiently secured to the pedestal 121, the clamping arm 126 and the hydraulic pressure cylinder 124 can be omitted.

Hereinafter, the front-rear direction and a depth direction may be referred to as the Z axis, a right direction of the left-right direction is referred to as the X axis, and the up-down direction may be referred to as the Y axis.

The moving device 10 includes an X-axis moving device 10A, a Z-axis moving device 10B, a moving column 20 and a Y-axis moving device 10C.

The X-axis moving device 10A includes left-right direction guides 15, guide blocks 15a, a left-right direction moving saddle 18, and a left-right direction driving device 13. Two linear guides 15 are disposed in parallel with each other on an upper face of the bed 11 on a rear side of the bed 11. The moving saddle 18 is placed on the guides 15 via the guide blocks 15a to be movable in the left-right direction. The driving device 13 for driving the moving saddle 18 is disposed on the bed.

The Z-axis moving device 10B includes front-rear direction linear guides 19, guide blocks 19a, and a front-rear direction driving device 17. Two of the linear guides 19 are disposed on the upper face of the moving saddle 18 in the front-rear direction in parallel. The moving column 20 is placed on the linear guides 19 via the guide blocks 19a to be movable in the front-rear direction. The driving device 17 for driving the moving column 20 is disposed on upper face of the moving saddle 18.

The moving column 20 supports the Y-axis moving device 10C on a front face thereof. The Y-axis moving device 10C includes up-down direction linear guides 21, guide blocks 21a (see FIG. 4), and an up-down direction driving device 22. Two linear guides 21 are fixed to the front face of the moving column 20. The linear guides 21 support the spindle head 23 through the guide blocks 21a (see FIG. 4). The driving device 22 is mounted on the front face of the moving column 20 to drive the spindle head 23 in the up-down direction.

Figure 3:
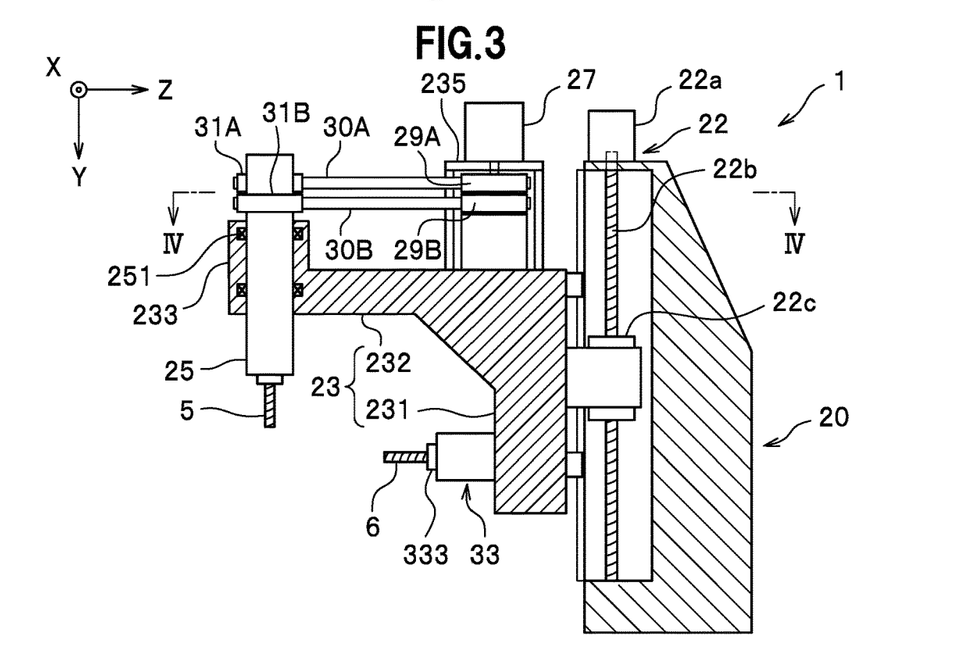
FIG. 3 is a cross section taken along line III-III in FIG. 2.

The driving device 13, the driving device 17, and the driving device 22 can use a servo motor-ball screw mechanism or a liner motor mechanism. As shown in FIG. 3, the driving device 22 includes a servo motor 22a serving as a drive force source, a ball screw 22b coupled to the servo motor 22a, and a ball nut 22c screwed with the ball screw 22b. The ball nut 22c is fixed to a back face of the spindle head 23. Descriptions about the driving device 13, the driving device 17 are omitted because they have the same structures as the driving device 22.

The spindle head 23 can move in the front-rear direction, the left-right direction, and the up-down direction relative to the work-table 12. In the first embodiment, the machine tool 1 includes the work-table 12 fixed to the bed 11, and the spindle head 23 movable in the front-rear direction, the left-rear direction, and up-down direction. This configuration of the axes is preferable for the case in which the work-table 12 is placed on a turn table.

Machine tool 1 includes a moving column 20 and the spindle head 23 which is movable in the up-down direction and installed on the moving column 20. Thus, the machine tool 1 has a small size and a small width.

However, the present embodiment is not limited to this configuration. For example, this configuration may be modified. The work-table 12 is provided at a front area of the bed 11 to have movements in the Z-axis direction, and the X-axis direction. Further, the moving column 20 may be fixed to a rear area of the bed 11, and the spindle head 23 may be provided to have movement in the Y-axis direction on the moving column. The axis-configuration can be selected in accordance with a size of the spindle head 23 and the arrangement method of the work-table 12.

Figure 2:
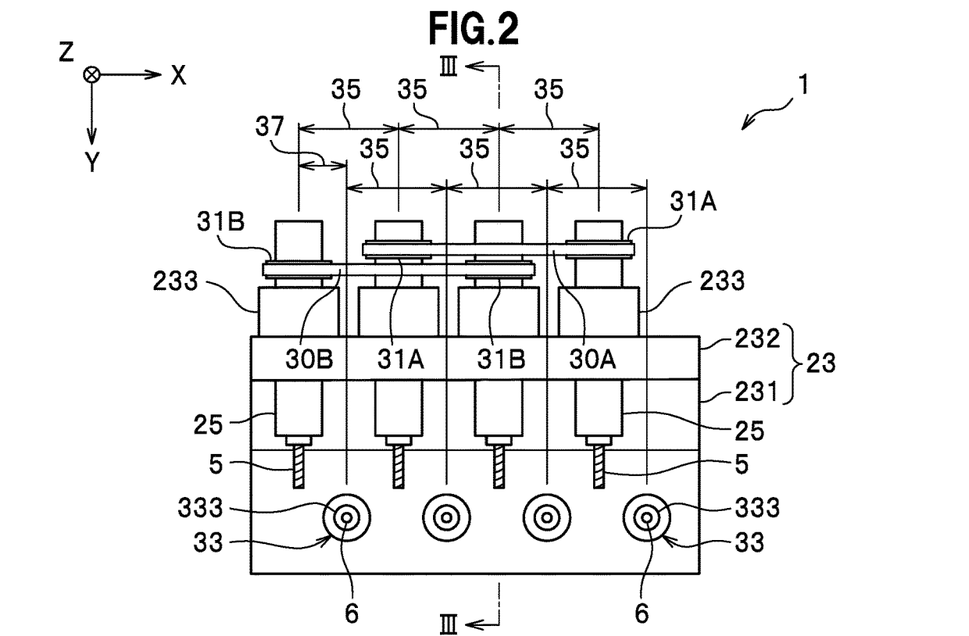
FIG. 2 is a view of main parts of a spindle head viewed from a direction II in FIG. 1.

The spindle head 23 is described below, referring to FIGS. 2 and 3. FIG. 2 shows the spindle head 23 viewed from II direction in FIG. 1 in which a part of detailed configurations of the spindle driving device such as the spindle motor.

The spindle head 23 includes a vertical plate 231 extending in the vertical direction and a horizontal plate 232. The horizontal plate 232 extends from an upper part of the vertical plate 231 horizontally from the vertical plate 231 to the work-table 12. Accordingly, the spindle head 23 has an inverse-L shape in side view. The horizontal plate 232 and the vertical plate 231 have rectangular parallelepiped shapes. Main spindle bodies 33 are installed at a lower end part of the vertical plate 231 extending in the front-rear direction (Z axis). Housings 233 having a cylindrical shape, and extending in the vertical direction are installed at a front end part of the horizontal plate 232. The vertical main spindle 25 is installed inside the housing 233 rotatable on an axis in the vertical direction (Y axis).

The vertical main spindles 25 can be arranged in line in the left-right direction which is the arranging direction. It is preferable that the number of and the interval 35 of the vertical main spindles 25 are the same as those of the workpieces 4 (see FIG. 1).

The vertical main spindle 25 is configured to fix a tool 5. The vertical main spindle 25 has a tool clamping device (not shown) (i.e. collet and tool holder).

Hereinbelow, a case in which four vertical main spindles 25 are arranged, is described blow. The vertical main spindle 25 is supported by spindle bearings 251 installed in the housing 233. The tool 5, which is a rotating tool, is attached to a tip portion (on a lower side in the vertical direction) of the vertical main spindle 25. Slave pulleys 31A, 31B are installed at a base end of the vertical main spindle 25. A motor bed 235 having a table-shape is fixed to a rear part of the horizontal plate 232. A main spindle motor 27 is fixed to an upper face of the motor bed 235, extending in the vertical direction. A drive pulley 29A and a drive pulley 29B are arranged in the vertical direction as an upper drive pulley and a lower drive pulley, respectively, and fixed on an output shaft of the motor 27. An endless belt 30A is wound around the pulley 29A and the pulleys 31A. An endless belt 30B is wound around the pulley 29B and the pulleys 31B.

Figure 4:
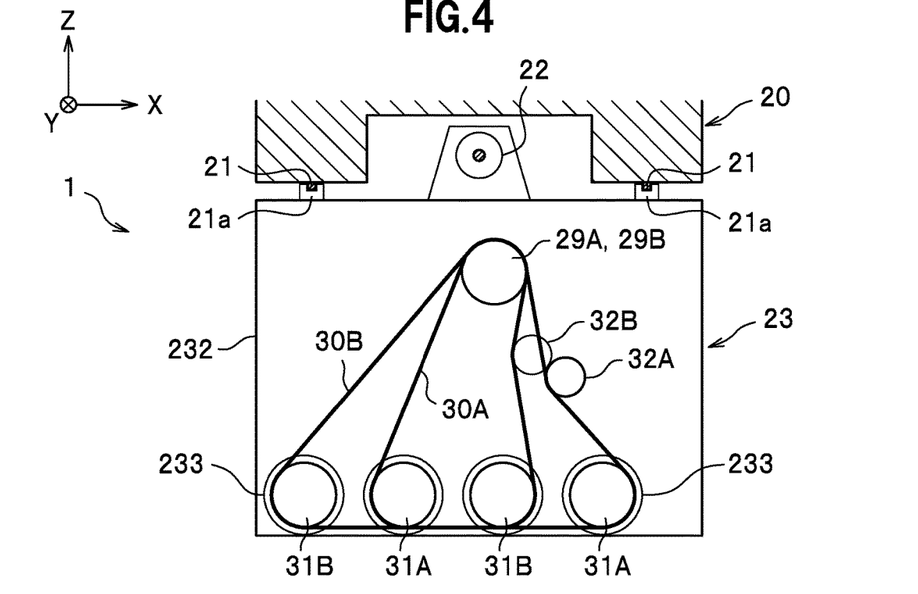
FIG. 4 is a cross section taken along line IV-IV in FIG. 3.

As shown in FIG. 4, tension in the belts 30A, 30B may be regulated by the idler pulleys 32A, 32B, respectively. The first and third vertical main spindles 25 arranged from the left side of FIG. 2 are coupled to the pulley 29B with a lower endless belt 30B. The second and fourth vertical main spindles 25 arranged in FIG. 2 from the left side of the drawing are coupled to the pulley 29A with the belt 30A.

The vertical main spindle 25 can house a built-in motor. Further, the drive force of the motor 27 may be transmitted through a gear mechanism in place of the belt transmission mechanism.

Figure 5:
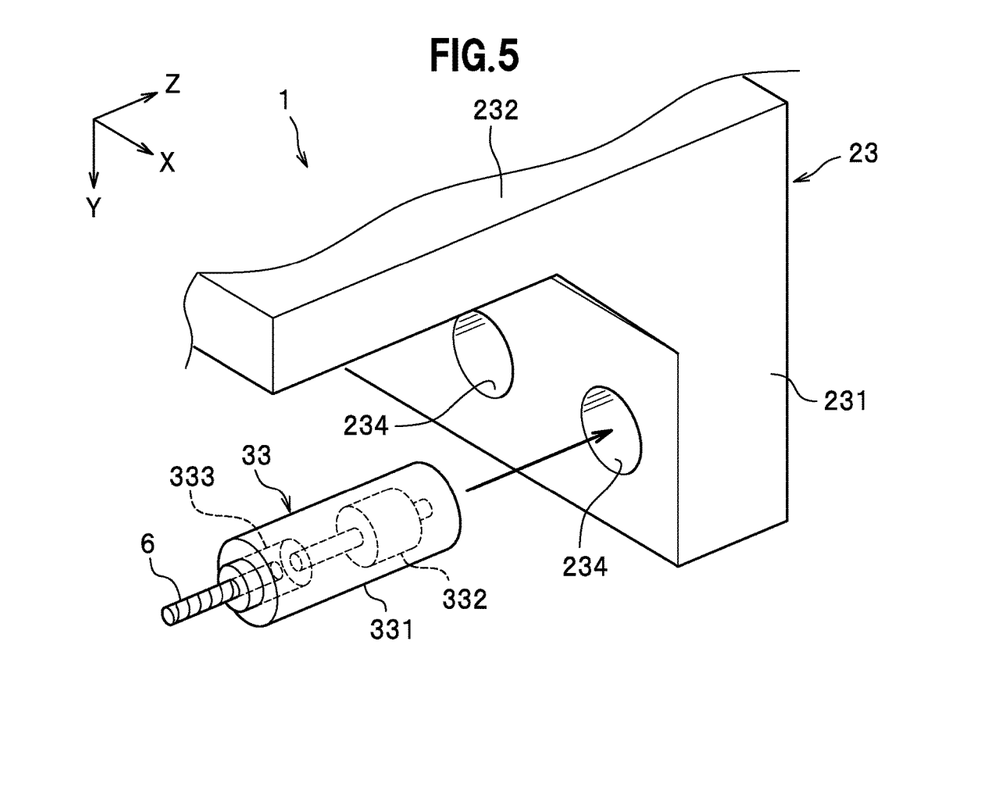
FIG. 5 is a partial exploded view of the spindle head according to the first embodiment.

The main spindle body 33 is described below referring to FIG. 5. The main spindle body 33 includes a casing 331, a motor 332, and the horizontal main spindle 333. The casing 331 has a circular hollow cylindrical shape. The motor 332 is installed inside the casing 331 at a rear end of the casing 331. The horizontal main spindle 333 coupled to a rotor of the motor 332 is rotatably supported in the casing 331.

The vertical plate 231 has horizontal main spindle mounting holes 234 extending in the front-rear direction at a lower end part thereof. The mounting hole 234 is made to fit to the main spindle body 33. The main spindle body 33 is inserted into and fixed to the mounting hole 234.

In FIG. 2, the horizontal main spindles 333 are preferably arranged in an arranging direction (left-right direction in FIG. 2) in line. The horizontal main spindles 333 are arranged with the same interval 35 as the interval with which the workpieces 4 are arranged. The horizontal main spindle 333 is configured to fix a tool 6. The horizontal main spindle 25 has the tool clamping device (not shown).

Further preferably, the vertical main spindles 25 and the horizontal main spindles 333 are arranged alternately in front view. An interval 37 between the leftmost vertical main spindle 25 and the leftmost horizontal main spindle 333 is a half of the interval 35.

Figure 6:
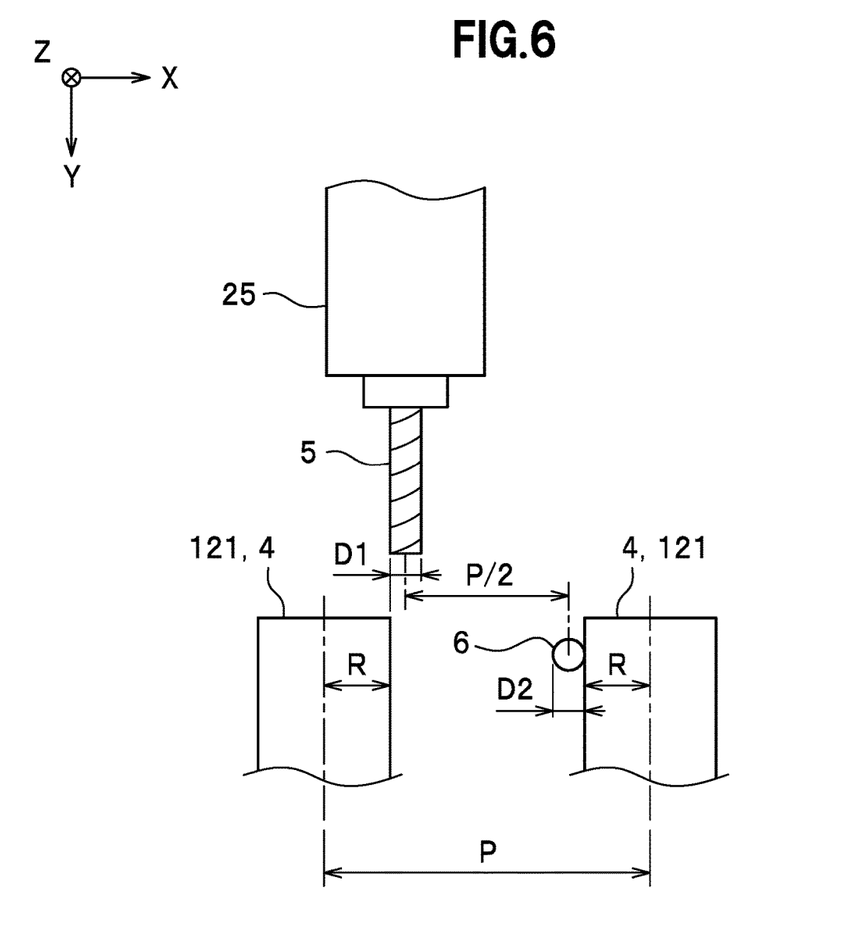
FIG. 6 is a front view of the machine tool according to the first embodiment to show a drilling process on a workpiece having a maximum size for the machine tool with tools.

Further, a size of the workpiece 4 is restricted to such size that a tool 6 does not interfere with the workpiece 4 during the tool 5 machines an edge of the workpiece 4. FIG. 6 shows a state that the tool 5 processes the workpiece 4 having a maximum size in the front view. Referring to FIG. 6, Eq. (1) may be given to determine the interval 35.

$$R < (P - D1 - D2)/4 \qquad \text{Eq. (1)}$$

where, a maximum rotation radius of the workpiece 4 is R, the interval 35 is P, a diameter of the tool 5 is D1, and a diameter of the tool 6 is D2.

When Eq. (1) is satisfied, the tool 6 does not interfere with the workpiece 4 or the pedestal 121. Similarly, when the tool 6 machines the workpiece 4, the tool 5 does not interfere with the pedestal 121.

As the tool 5 and the tool 6, drill bits, reamers, taps, mills, and other rotating tools are usable.

A structure of the vertical main spindle 25 and the horizontal main spindle 333 can be changed. For example, a built-in motor can be used in the vertical main spindle 25 similar to the horizontal main spindle 333.

In the drawings, each of the vertical main spindles 25 and the horizontal main spindles 333 holds a single rotating tool. However, a multi-spindle head can be attached to each of the vertical main spindles 25 and the horizontal main spindles 333.

Referring to FIG. 1 mainly, operations of the machine tool 1 are described below. Since the machine tool 1 includes the vertical main spindle 25 and the horizontal main spindle 333, machining can be performed in two directions, i.e., horizontal direction and the vertical directions once the workpiece 4 is fixed to the work-table 12.

The spindle head 23 can be moved in the vertical direction, the left-right direction, and the front-rear direction. The machine tool 1 can machine the workpiece 4 at an arbitrary position.

According to a machine tool (not shown) including a spindle extending in one direction and a swing table, if the machining in two directions is made as follows:

The workpiece is positioned in one direction. Next, machining is made after the spindle head is approached to the workpiece and the spindle head is once released in the Z-axis direction. After the work-table 12 is tilted by the swinging device by 90 degrees, the main head is approached to the workpiece and performs the machining again. The process is completed after the spindle head is released in the Z-axis direction.

On the other hand, according to the machine tool 1, the machining can be successively made in the vertical direction and the horizontal direction while the spindle head 23 keeps close to the workpiece 4 without change of the position or the orientation of the workpiece 4. Accordingly, a non-processing time can be largely reduced.

The spindle head 23 includes the vertical plate 231 extending in the vertical direction and the horizontal plate 232. The horizontal plate 232 is provided on the vertical plate 231 and extends toward the work-table 12. Further, the vertical main spindles 25 are arranged at one end part of the horizontal plate 232. The horizontal main spindles 333 are arranged at a lower end part of the vertical plate 231. As a result, the tools 5 and the tools 6 are arranged, surrounding the workpieces 4 in side view. Accordingly, when the workpiece 4 is machined in vertical and horizontal directions by movement in the left-right direction, the front-rear direction, a stroke of the movement of the spindle head 23 in the front-rear and up-down direction can be decreased. The front-rear direction linear guide 19, the front-rear direction driving device 17, the up-down direction linear guide 21, and the left-right direction guide 15 are determined in length in accordance with the strokes, so that the machine tool 1 can be formed in a small size.

The machine tool 1 includes the vertical main spindle 25 arranged in the vertical direction and the horizontal main spindle 333 arranged in the horizontal direction.

The main spindles arranged in the two directions which are the horizontal direction and the vertical direction, respectively, which have an orthogonal relation, so that the machine tool 1 can be operated easily.

The machine tool 1 includes a plurality of the vertical main spindles 25 arranged in the arraigning direction (horizontal direction) with the interval 35 (see FIG. 2) and the horizontal main spindles 333 of which the number is the same as the number of the vertical main spindles 25. Further, the work-table 12 can clamp the workpieces 4 of which the number is the same as the vertical main spindles 25 with the interval 35 in the arranging direction. Accordingly, the same machining processes for a plurality of the workpiece 4 can be performed simultaneously.

When the machine tool 1 includes a plurality of the vertical main spindles 25 and a plurality of the horizontal main spindle 333, and a plurality of the workpieces 4 whose the number is the same, the vertical main spindles 25 and the horizontal main spindle 333 are arranged alternately in the horizontal direction. When a machining process in the vertical direction is performed, the tool 6 runs into a space between adjoining workpiece 4. Accordingly when the workpiece 4 is machined with the tool 5 extending in the vertical direction, the tool 6 extending in the horizontal direction does not interferes with the workpiece 4. Accordingly, the tool 6 and the workpiece 4 are not damaged. When the tool 6, extending in the horizontal direction, machines the workpiece 4, the tool 5 passes through the space between adjoining workpieces 4. As a result, the tool 5 does not interfere with the workpiece 4.

The work-table 12 includes the pedestal 121 arranged on the bed 11 rotatable on the rotation axis 3 extending in the vertical direction or front-rear direction and the motor 122 for rotating the pedestals 121. Accordingly, once the workpiece 4 is set on the pedestal 121, the machine tool 1 can machine workpiece 4 in direction along the rotation axis 3 and any direction perpendicular to the rotation axis 3.

The horizontal main spindle 333 is housed in the main spindle body 33 together with the motor 332. The main spindle body 33 is mounted on the spindle head 23 integrally with the horizontal main spindle 333 and the motor 332, so that the horizontal main spindle 333 and the motor 332 can be replaced with new ones easily.

Second Embodiment

Figure 7:
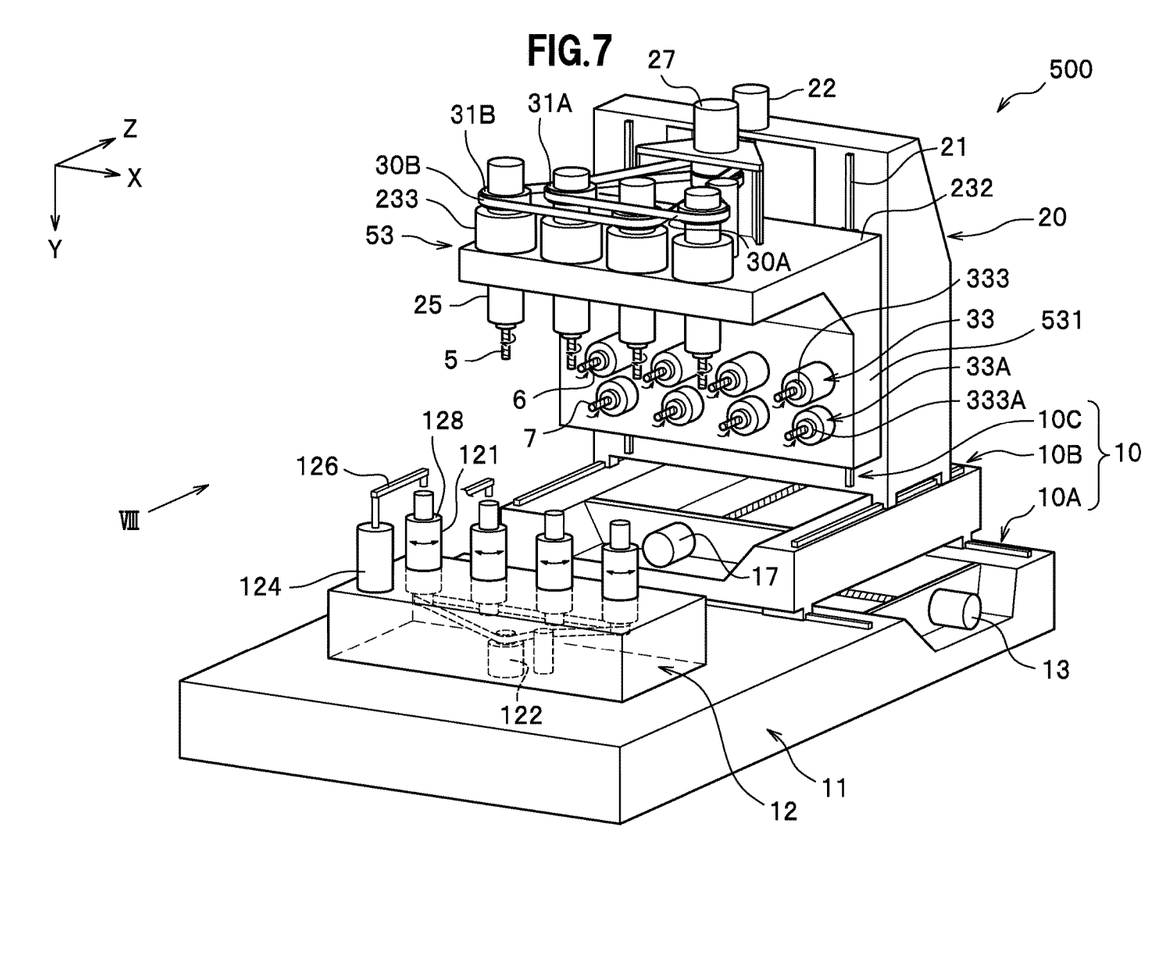
FIG. 7 is a perspective front view of a machine tool according to a second embodiment of the present invention.

A machine tool 500 according to a second embodiment is described below referring to FIG. 7.

The machine tool 500 is different from the machine tool 1 in that two rows of the horizontal main spindles 333, 333A are arranged on a spindle head 53 in vertical direction. Other configurations of the machine tool 500 are the same as those in the machine tool 1.

Hereinbelow, the same configuration as the machine tool 1 is designated with the same reference, and a detailed description is omitted.

The spindle head 53 includes a vertical plate 531 and the horizontal plate 232. The vertical plate 531 includes four of the horizontal main spindle mounting holes 234 and four of the horizontal main spindle mounting holes 234A in two rows (upper and lower) (see FIG. 8), respectively.

Figure 8:
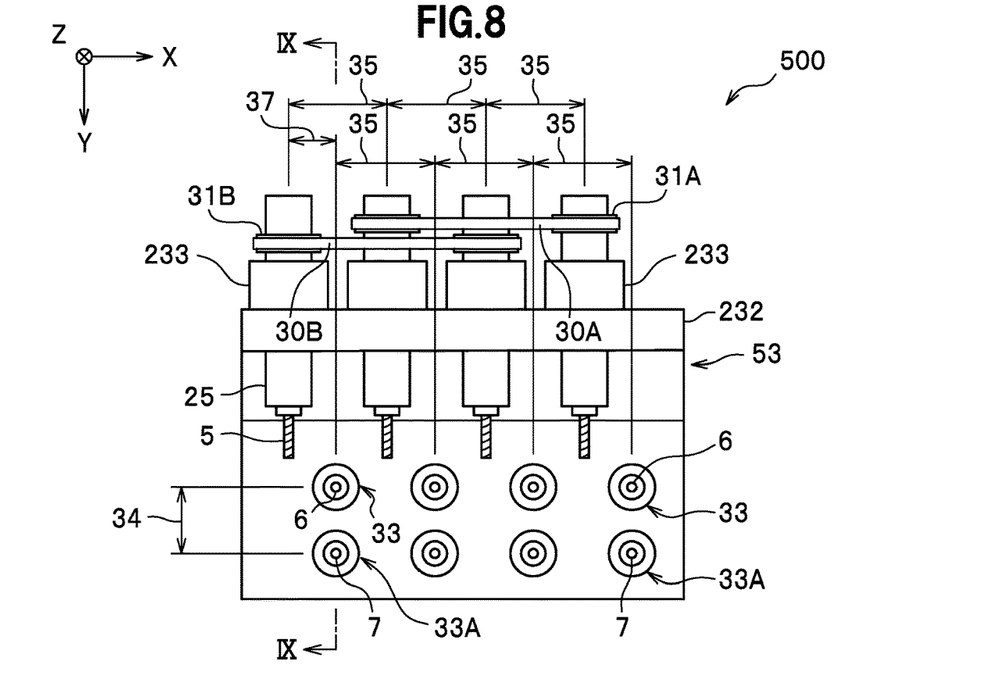
FIG. 8 is a view of main parts of a spindle head viewed from a direction VIII in FIG. 7.
Figure 9:
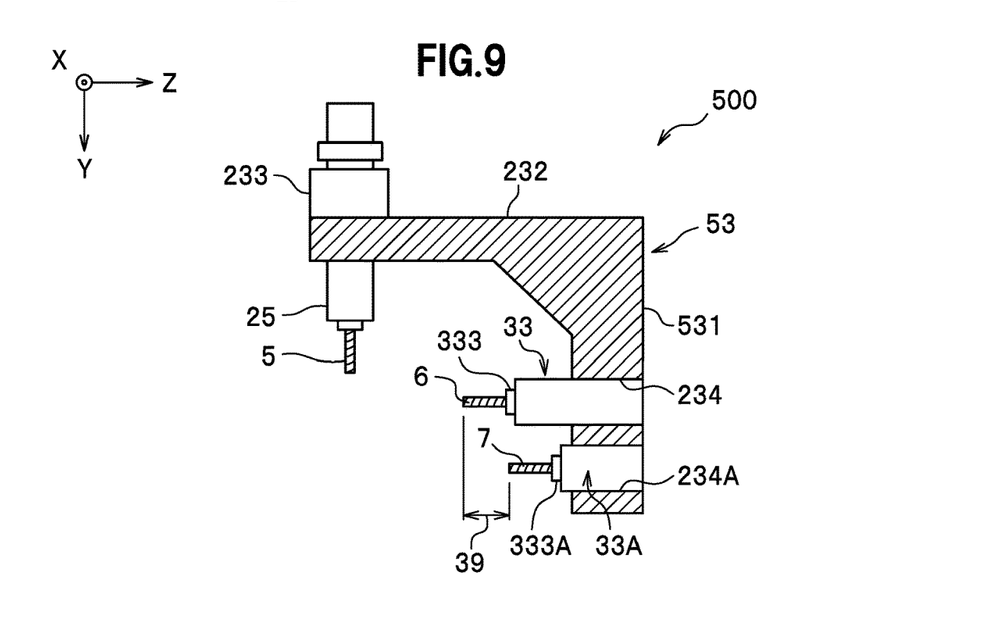
FIG. 9 is a cross section taken along line IX-IX in FIG. 8.

In FIG. 8, a spindle head body 33A is fitted into and inserted into the horizontal main spindle mounting hole 234A at a lower row (see FIG. 9). The vertical main spindles 25 and the horizontal main spindles 333 are alternately mounted in the left-right direction. Further the horizontal main spindles 333, 333A of two rows, i.e., upper and lower rows, are arranged at a regular interval like a grid. The vertical main spindles 25, the horizontal main spindles 333, 333A are arranged in line in the arranging direction (left-right direction) with the interval 35. There is an interval 37 between the vertical main spindles 25 and the horizontal main spindles 333, 333A is a half of the interval 35. Between two rows of the horizontal main spindles 333, 333A, there is the interval 34.

Preferably, interval 34 satisfies Equation below.

$$H+H2<L \qquad \text{Eq. (2)}$$

where
the interval 34 is L,
a height of the workpiece 4 is H, and
a height of an upper face of the clamping arm 126 from the workpiece 4 is H2.

In FIG. 9, the main spindle body 33 is fitted into and inserted into the horizontal main spindle mounting hole 234 at the upper row. The horizontal main spindle 333 of the upper row is arranged to be protruded in the front direction from the horizontal main spindle 333A. A tool 7, which is a rotating tool, is attached to the horizontal main spindle 333A.

The rotating tool 6 attached to the horizontal main spindle 333 at the upper row protrudes from the rotating tool 7 attached to the horizontal main spindle 333A in the front direction by an interval 39.

Preferably, the interval 39 satisfies equation below.

$$(R2-R)<L2 \qquad (3)$$

where
the interval 39 is L2,
a maximum rotation radius of the pedestal 121 is R2, and
the interval 39 is determined such that R<R2.

When the horizontal main spindles 333, 333A are so arranged that Eq. (3) is satisfied, the rotating tool 7 does not interfere with the pedestal 121 mounted on the horizontal main spindle 333A of the lower row when the rotating tool 6 attached to the low row of the horizontal main spindle 333A machines the workpiece 4.

The machine tool 500 configured as mentioned above operates as follows:

The horizontal main spindles 333, 333A are arranged in the left-right direction at a regular interval which is equivalent to the arrangement interval of the workpieces 4. Further, the horizontal main spindles 333, 333A and the vertical main spindle 25 are alternately arranged. Accordingly, when a machining process in the vertical direction is made, the tools 6, 7 run into the space between adjoining workpieces 4. Accordingly the tools 6, 7 and the workpieces 4 are not damaged. When the tool 6 or the tool 7 machines the workpiece 4, the tool 5 for the vertical process runs into the space between the adjoining workpieces 4, the tool 5 does not interfere with the workpiece 4.

Preferably, the upper row of the horizontal main spindle 333 and the lower row of the horizontal main spindle 333A are arranged in the up-down direction with an interval which is made larger than a sum of heights of the workpiece 4 and the clamping arm 126. With this configuration, the lower row of the horizontal main spindle 333A does not interfere with the workpiece 4 while the upper row of the horizontal main spindle 333 machines the workpiece 4. Similarly, the upper row of the horizontal main spindle 333 does not interfere with the workpiece 4 and the clamping arm 126, while the lower row of the horizontal main spindle 333A machines the workpiece 4.

The horizontal main spindle 333 at the upper row protrudes from the horizontal main spindle 333A of the lower row in the front direction, and the tool 7 of the lower row does not reach the workpiece 4 and the work-table 12. Accordingly, the tool 7 of the lower row for machining in the horizontal direction does not interfere with the workpiece 4 and the pedestal 121.

Since the machine tool 500 includes the two rows, i.e., upper and lower rows, of the horizontal main spindle 333, 333A, two types of the tools 6, 7 for the horizontal-direction machining process can be attached. Accordingly, two types of the machining process in the horizontal direction can be implemented in one machine tool in addition to the vertical-direction machining process.

As the tools 6, 7, a turning tool (for example, bite) may be used together with the pedestal 121 which is rotatable in addition to the rotating tool.

Instead the two rows of the horizontal main spindles 333, 333A, two rows of the vertical main spindles 25 may be installed.

The present invention has been described according to the first and second embodiments. However, the person skilled in the art can modify or improve the machine tools 1, 500 described in the first and second embodiments. The present invention is not limited to the descriptions in the first and second embodiments. For example, the number of the vertical main spindles 25, the horizontal main spindles 333, and the workpieces 4 can be set arbitrary. The position of the main spindle can be changed according to the necessary machining position and the machining process for the workpiece 4.

Further, the horizontal main spindle 333 may be configured to be movable relatively to the spindle head 23 along an axis of the horizontal main spindle 333. In this case, since the horizontal main spindle 333 can be moved, degrees of freedom in designing the spindle head 23, the work-table 12, and the horizontal main spindle 333 increases. In this case, it is not necessary to protrude the tool 6 for the horizontal direction machining process at the upper row from the lower row of the tool 7 for the horizontal machining process at the lower row.

Similarly, the vertical main spindle 25 may be configured to be movable along the axis of the vertical main spindle 25 for the spindle head 23.

Further, the machine tools 1, 500 may be configured to include one of the vertical main spindles 25 and the horizontal main spindles 333, 333A. In this case, the vertical main spindle 25 and the horizontal main spindles 333 can be arranged stepwise.

We claim:

1. A machine tool comprising:
    a bed;
    a work-table provided to the bed;
    a moving device provided to the bed;
    a spindle head provided to the moving device and movable in a plurality of directions;
    a vertical main spindle mounted to the spindle head and movable with the spindle head, the vertical main spindle extending in the vertical direction, the vertical main spindle configured to set a first tool; and
    a horizontal main spindle mounted to the spindle head at a fixed location relative to the vertical main spindle and movable with the spindle head and the vertical main spindle, the horizontal main spindle extending in the horizontal direction, the horizontal main spindle configured to set a second tool.

2. The machine tool according to claim 1, wherein the moving device is configured to move the spindle head in an up-down direction, a left-right direction, and a front-rear direction.

3. The machine tool according to claim 2,
    wherein the vertical main spindle has a plurality of vertical main spindles spaced with a predetermined interval in an arranging direction orthogonal with the vertical main spindle and the horizontal main spindle,
    the horizontal main spindle has a plurality of horizontal main spindles spaced with an interval equal to the predetermined interval in the arranging direction, and
    the work-table includes a plurality of holding pedestals spaced with the interval in the arranging direction, the holding pedestals configured to hold a plurality of workpieces.

4. The machine tool according to claim 3, wherein the work-table includes a holding pedestal configured to hold a workpiece of the plurality of workpieces, the holding pedestal rotatably supported on a rotation axis extending in the vertical or horizontal direction and a drive motor configured to rotate the holding pedestal.

5. The machine tool according to claim 1,
    wherein the vertical main spindle has a plurality of vertical main spindles spaced with a predetermined interval in an arranging direction orthogonal with the vertical main spindle and the horizontal main spindle,
    the horizontal main spindle has a plurality of horizontal main spindles spaced with an interval equal to the predetermined interval in the arranging direction, and
    the work-table includes a plurality of holding pedestals spaced with the interval in the arranging direction, the holding pedestals configured to hold a plurality of workpieces.

6. The machine tool according to claim 5, wherein the work-table includes a holding pedestal configured to hold a workpiece of the plurality of workpieces, the holding pedestal rotatably supported on a rotation axis extending in the vertical or horizontal direction and a drive motor configured to rotate the holding pedestal.

7. The machine tool according to claim 5, wherein a plurality of the vertical main spindles and the plurality of the horizontal main spindles are alternately arranged in the arranging direction.

8. The machine tool according to claim 7, wherein the work-table includes a holding pedestal configured to hold a workpiece of the plurality of workpieces, the holding pedestal rotatably supported on a rotation axis extending in the vertical or horizontal direction and a drive motor configured to rotate the holding pedestal.

9. The machine tool according to claim 3, wherein the work-table includes a holding pedestal configured to hold a workpiece, the holding pedestal rotatably supported on a rotation axis extending in the vertical or horizontal direction and a drive motor configured to rotate the holding pedestal.

10. The machine tool according to claim 3, wherein a plurality of the vertical main spindles and the plurality of the horizontal main spindles are alternately arranged in the arranging direction.

11. The machine tool according to claim 10, wherein the work-table includes a holding pedestal configured to hold a workpiece, the holding pedestal rotatably supported on a rotation axis extending in the vertical or horizontal direction and a drive motor configured to rotate the holding pedestal.

12. The machine tool according to claim 2, wherein the work-table includes a holding pedestal configured to hold a workpiece, the holding pedestal rotatably supported on a rotation axis extending in the vertical or horizontal direction and a drive motor configured to rotate the holding pedestal.

13. The machine tool according to claim 1, wherein the spindle head includes:
    a vertical plate extending in the vertical direction;
    a horizontal plate extending from an upper part of the vertical plate in a horizontal direction;
    wherein the vertical main spindle is provided to the horizontal plate; and
    the horizontal spindle is provided to the vertical plate.

14. The machine tool according to claim 13, wherein the work-table includes a holding pedestal configured to hold a workpiece, the holding pedestal rotatably supported on a rotation axis extending in the vertical or horizontal direction and a drive motor configured to rotate the holding pedestal.

15. The machine tool according to claim 13,
    wherein the vertical main spindle has a plurality of vertical main spindles spaced with a predetermined interval in an arranging direction orthogonal with the vertical main spindle and the horizontal main spindle,
    the horizontal main spindle has a plurality of horizontal main spindles spaced with an interval equal to the predetermined interval in the arranging direction, and
    the work-table includes a plurality of holding pedestals spaced with the interval in the arranging direction, the holding pedestals configured to hold a plurality of workpieces.

16. The machine tool according to claim 15, wherein the work-table includes a holding pedestal configured to hold a workpiece, the holding pedestal rotatably supported on a rotation axis extending in the vertical or horizontal direction and a drive motor configured to rotate the holding pedestal.

17. The machine tool according to claim 15, wherein a plurality of the vertical main spindles and the plurality of the horizontal main spindles are alternately arranged in the arranging direction.

18. The machine tool according to claim 17, wherein the work-table includes a holding pedestal configured to hold a workpiece of the plurality of workpieces, the holding pedestal rotatably supported on a rotation axis extending in the vertical or horizontal direction and a drive motor configured to rotate the holding pedestal.

19. The machine tool according to claim 18,
wherein the vertical main spindle has a plurality of vertical main spindles spaced with a predetermined interval in an arranging direction orthogonal with the vertical main spindle and the horizontal main spindle,
the horizontal main spindle has a plurality of horizontal main spindles spaced with an interval equal to the predetermined interval in the arranging direction, and
the work-table includes a plurality of holding pedestals spaced with the interval in the arranging direction, the holding pedestals configured to hold a plurality of workpieces.

20. The machine tool according to claim 2, wherein the spindle head comprises an L-shape including a vertical plate and a horizontal plate, the vertical main spindle being mounted to the horizontal plate and the horizontal main spindle being mounted to the vertical plate.

21. The machine tool according to claim 2, wherein the vertical main spindle has a first tool attached thereto and the horizontal main spindle has a second tool attached thereto different from the first tool.

* * * * *